Dec. 10, 1929.  A. H. RUBY  1,739,093
GAS SEPARATOR
Filed June 17, 1926
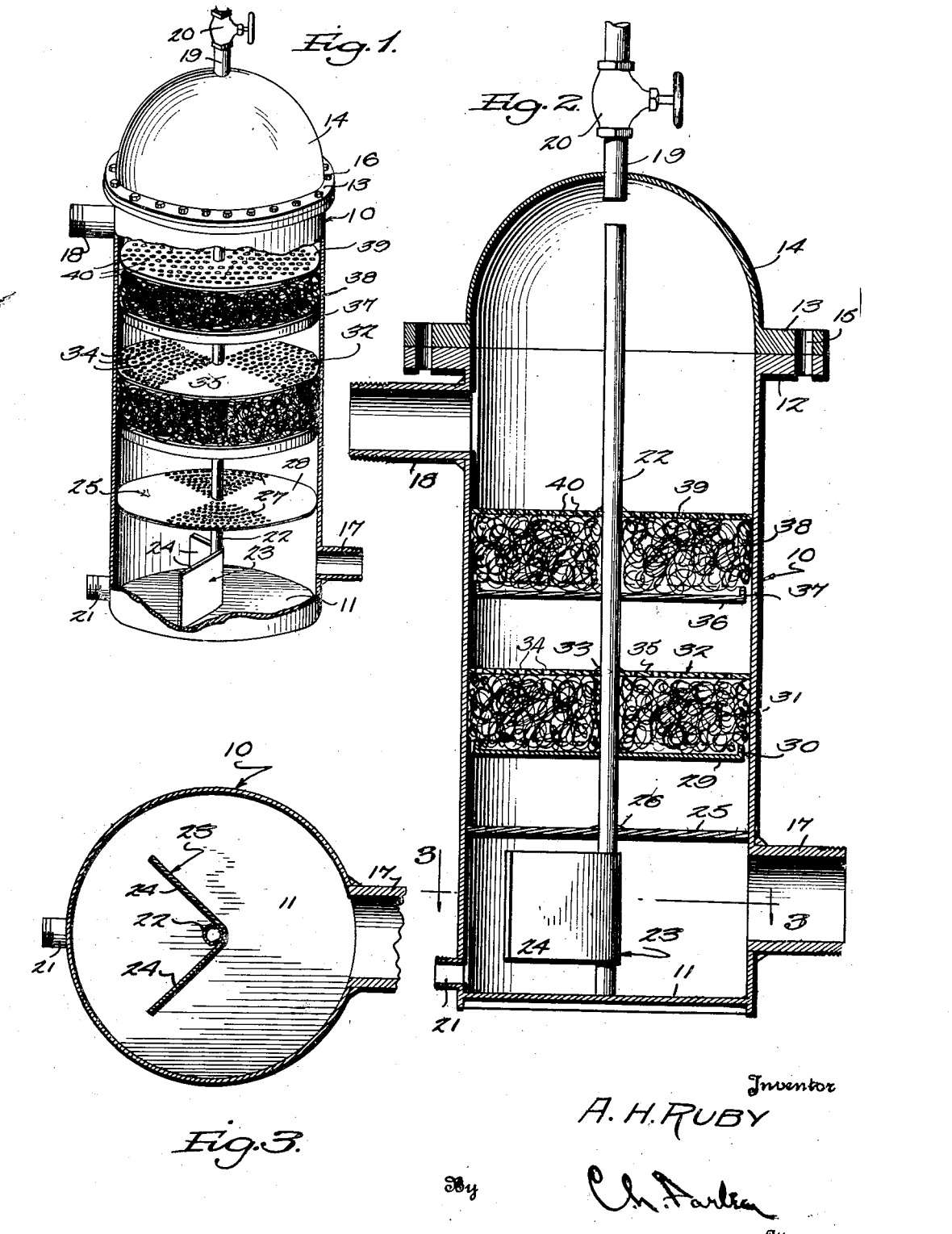

Patented Dec. 10, 1929

1,739,093

UNITED STATES PATENT OFFICE

ARTHUR HARRIS RUBY, OF PONCA CITY, OKLAHOMA, ASSIGNOR, BY MESNE ASSIGNMENTS, TO CONTINENTAL OIL COMPANY, OF PONCA CITY, OKLAHOMA, A CORPORATION OF DELAWARE

GAS SEPARATOR

Application filed June 17, 1926. Serial No. 116,682.

This invention relates to gas separation, and more particularly to a dust and scale collector for natural gas pipe lines.

Considerable difficulty has been experienced with natural gas systems due to the presence of dust and scale in the gas which injures and interferes with the operation of the orifice meters, regulators, domestic meters, etc.

This dust and scale is mostly a non-magnetic iron rust caused by the presence of oxygen and water vapors in the gas. These substances are always present in the gas and consequently the dust and scale constantly are being formed and it is highly desirable to separate such foreign matter from the gas before permitting it to pass to the meters and other operating appliances associated with the gas line.

An important object of the present invention is to provide a novel device arranged between the natural gas source and operating devices associated with the gas line for collecting dust, scale and other foreign matter in the natural gas to prevent injury to and interference with the operating devices.

A further object is to provide a novel dust and scale collecting device employing bodies of loose material to act as filter mediums, suitable baffles being associated with said filter mediums for causing the gas to be spread evenly through the filter medium to permit the foreign matter to be taken up thereby.

A further object is to provide supports for the filter mediums in the form of plates having flanges at their outer edges to form collecting pans for the dust which becomes loosened from the filter mediums and drops therefrom.

A further object is to provide a device of the above mentioned character wherein all the elements associated together to provide the separating action are carried by a common supporting member arranged in a casing and readily removable therefrom to permit the device to be cleaned, etc.

Other objects and advantages of the invention will become apparent during the course of the following description.

In the drawings I have shown one embodiment of the invention. In this showing:

Figure 1 is a perspective view of the device, parts being broken away,

Figure 2 is a central vertical sectional view, parts being shown in elevation, and, Figure 3 is a section on line 3—3 of Figure 2.

Referring to the drawings the numeral 10 designates a suitable casing which is preferably cylindrical in form and provided with a closed bottom 11. At its upper end, the casing 10 is provided with a horizontal annular flange 12 upon which is supported a similar flange 13 carried by and preferably formed integral with a dome 14. The flanges 12 and 13 are provided with registering openings 15 for the reception of bolts or other fastening elements 16 whereby the dome may be secured to the casing. The casing is provided in one side, adjacent its lower end, with a gas inlet pipe 17 connected to a suitable source of natural or other gas supply. The casing 10 is similarly provided near its upper end with an outlet pipe 18 for containing the gas of orifice meters, regulators, and other similar devices, as will be apparent. The dome 14 is provided with a pipe 19 connected to a suitable pressure relief valve 20, as shown in Figures 1 and 2. The lower end of the casing 10 is provided substantially opposite the pipe 17 with a clean out pipe 21.

A common supporting standard 22 is arranged within the casing and dome substantially axially thereof. This standard may be formed of tubular material, as shown in Figure 3, if desired. A baffle plate 23 is welded or otherwise secured to the standard 22 adjacent its lower end and opposite the pipe 17. This baffle plate is bent at its center around the standard 22 to form a pair of angular plates 24 for deflecting gas flowing into the casing from the pipe 17. An orifice plate 25 extends entirely across the casing 10 just above the pipe 17, this plate being secured to the standard 22 by welding or the like, as indicated at 26. The plate 25 is provided in opposite portions thereof with orifices 27, the portions of the plate intermediate the orifices being imperforate as indicated at 28.

A collecting pan 29 is arranged above and spaced from the plate 25, as clearly shown in Figures 1 and 2. This pan is provided with a peripheral upstanding flange 30 slightly spaced from the walls of the casing to provide a passage for the incoming gases. A body of filter material 31 is supported upon the pan 30 and substantially fills the casing. This material is maintained in position by a second orifice plate 32 which also extends entirely across the casing and is welded or otherwise secured to the standard 22 as indicated at 33. The plate 32 is similar to the plate 25 previously described, being provided with orifices 34 oppositely arranged and divided by imperforate plate portions 35. The orifices 34 are preferably arranged above the imperforate portions 28 of the plate 25, as shown in Figure 1. A second collecting pan 36 is arranged over and spaced from the plate 32, and is secured to the standard 22. The pan 36 is also provided with a peripheral flange 37 slightly spaced from the walls of the casing to provide a gas passage, as will be obvious. A body of filtering material 38 also is arranged on the pan 36 and extends entirely across the casing. The bodies of filtering material 31 and 38 may be formed of any suitable material, and in practice, steel wool has been found excellent for the purpose. A third orifice plate 39 is arranged over and is adapted to confine the filtering material 38. The plate 39 is preferably perforated as at 40 throughout its entire area. The orifice plates 25, 32 and 39 act as baffles for the gas passing upwardly through the casing, and each of these plates is slidably mounted in the casing 10.

The operation of the device is as follows:

The pipe 21 is normally closed by a suitable cap and the large pipe 17 is connected to a suitable source of gas supply. This gas flows into the casing through the pipe 17 and strikes the baffle plate 23 to be spread out throughout the area of the casing, as will be apparent. The gas passes upwardly through the orifices 27 whereupon it encounters the pan 29 which deflects the gas outwardly. The gas passes around the peripheral flange 30 and into the filter material 31 which collects dust, scale and the like from the gas. The gas encounters the plate 32 and flows upwardly through the orifices 34 therein. After passing the plate 32, the gas finds its way into the filter material 38 by passing around the plate 36 and peripheral flange 37, any foreign matter remaining in the gas being separated therefrom by the filter material 38. The separating action having been completely carried out the plate 39 is preferably perforated throughout its area to permit a substantially free flow of gas therethrough. The flow however, is restricted sufficiently to prevent the gas from carrying any foreign matter with it, this matter being collected by the filter material 38. The filtered gas flows from the casing 10 through the pipe 18 to the orifice meters, regulators and other operating devices associated with the pipe line. Pressure may be relieved in the casing 10 by opening the valve 20, as will be obvious. When it is desired to clean the device the bolts 16 may be removed to permit removal of the dome 14. The standard 22 is then lifted from the casing carrying with it the various plates and pans secured thereto as well as the baffle plate 23 and the filter material. The filtering elements may be cleaned as well as the interior of the casing, and any foreign matter remaining in the bottom of the casing may be blown outwardly therefrom through the opening 21. The filtering material may be renewed at any time, and in replacing the material it is packed between the pan 29 and plate 32 and between the pan 36 and plate 39, these elements being fixed in position with respect to each other whereby it is apparent that any desired density in the filtering material may be obtained.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gas separator comprising a cylindrical casing, a central supporting standard arranged in said casing, a plurality of baffle plates arranged in said casing and spaced vertically from each other, the lower pair of said plates being provided with perforate and imperforate portions, the perforate portion of one plate being arranged in vertical alinement with the imperforate portion of the other plate of the pair, a supporting pan arranged between adjacent plates, each pan being provided with an upstanding peripheral flange spaced from said casing, a body of filter material arranged on each of said pans and extending entirely across said casing, each body of filter material being confined by a baffle plate arranged thereabove, and a spreader arranged beneath the lowermost plate, said spreader, said plates, and said pans being carried by said standard, said casing being provided opposite said spreader with an inlet conduit adapted to feed gas into said casing against said spreader.

2. A gas separator comprising a cylindrical casing, a plurality of perforate plates arranged in said casing and spaced vertically from each other, a plurality of circular pans arranged between adjacent pairs of plates, each of said pans being provided with a peripheral upstanding flange spaced from said casing, a body of filter material arranged on said pans, each body of filter material being confined by the plate thereabove, and a common means for supporting said pans and said plates.

3. A gas separator comprising a cylindrical casing, a plurality of perforate plates arranged in said casing and spaced vertically from each other, a plurality of circular pans arranged between adjacent pairs of plates, each of said pans being provided with a peripheral upstanding flange spaced from said casing, a body of filter material arranged on said pans, each body of filter material being confined by the plate thereabove, a common means for supporting said pans and said plates, said casing being provided beneath the lowermost plate with an inlet conduit, and a gas spreader arranged in said casing in the path of travel of gas from said inlet.

In testimony whereof I affix my signature.

ARTHUR HARRIS RUBY.